(12) United States Patent
Jankovic et al.

(10) Patent No.: US 11,984,829 B2
(45) Date of Patent: May 14, 2024

(54) ACTIVE DC BUS VOLTAGE BALANCING CIRCUIT

(71) Applicant: Rockwell Automation Technologies, Inc., Mayfield Heights, OH (US)

(72) Inventors: Zeljko Jankovic, Mequon, WI (US); Ji Jun Cao, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 91 days.

(21) Appl. No.: 17/558,866

(22) Filed: Dec. 22, 2021

(65) Prior Publication Data

US 2023/0198446 A1   Jun. 22, 2023

(51) Int. Cl.
*H02P 27/06* (2006.01)
*H02M 7/483* (2007.01)

(52) U.S. Cl.
CPC .......... *H02P 27/06* (2013.01); *H02M 7/4833* (2021.05); *H02P 2201/01* (2013.01); *H02P 2201/03* (2013.01)

(58) Field of Classification Search
CPC ... H02P 27/06; H02P 2201/01; H02P 2201/03
See application file for complete search history.

(56) References Cited

U.S. PATENT DOCUMENTS 9,246,379 B1   1/2016   Chui

FOREIGN PATENT DOCUMENTS

| CN | 114430240 A | * | 5/2022 |
| DK | 1995860 T3 | * | 12/2016 |
| EP | 1995860 A2 | | 11/2008 |

OTHER PUBLICATIONS

H. Ertl et al., "Active voltage balancing of DC-link electrolytic capacitors", IET Power Electronics IET Power Electron., 2008, vol. 1, No. 4, pp. 488-496, Dec. 2007.
Hans Ertl et al., "A Simple Active Method to Avoid the Balancing Losses of DC Link Capacitors", 24th International Conference on Power Electronics (PCIM), Nurnberg, Germany, May 20-22, 2003.
European Search Report for 22210516.5-1202, Mailed Apr. 25, 2023, 7 pages.

* cited by examiner

*Primary Examiner* — Kawing Chan (57) ABSTRACT

A system has a DC bus circuit with first and second terminals, an intermediate node, first and second capacitors, first and second depletion mode FETs, and first and second switching control circuits, where the first depletion mode FET has a drain coupled to the first bus terminal, a source, and a gate coupled to the intermediate node, the second depletion mode FET has a drain coupled to the intermediate node, a source, and a gate coupled to the second bus terminal, the first switching control circuit turns the first depletion mode FET off responsive to a first capacitor voltage of the first bus capacitor being less than or equal to a second capacitor voltage of the second bus capacitor, and the second switching control circuit turns the second depletion mode FET off responsive to the first capacitor voltage being greater than or equal to the second capacitor voltage.

15 Claims, 7 Drawing Sheets

ACTIVE DC BUS VOLTAGE BALANCING CIRCUIT

BACKGROUND INFORMATION

The subject matter disclosed herein relates to power converters and to apparatus and techniques to balance and discharge DC bus capacitors. Bus capacitor voltage balancing is useful in motor drives or other power conversion systems having high voltage DC bus circuits, for example, using electrolytic capacitors with insulation resistance that can vary based on applied voltage, temperature, age, design and manufacturing tolerances, leading to leakage current. In addition, DC bus capacitors store electric charge that is desired to discharge fast at lower voltage levels when control power supply is not available.

BRIEF DESCRIPTION

In one aspect, a system includes a DC bus circuit with a first bus terminal, a second bus terminal, a first bus capacitor, and a second bus capacitor. The first and second bus capacitors are coupled in series with one another between the first and second bus terminals and the first and second bus capacitors and are coupled to one another at an intermediate node. The system also includes a first depletion mode field effect transistor (FET) coupled between the first bus capacitor and a first switching control circuit, a second depletion mode FET coupled between the second bus capacitor and a second switching control circuit, and a control circuit configured to control the first and second depletion mode FETs to balance a first capacitor voltage of the first bus capacitor and a second capacitor voltage of the second bus capacitor.

In another aspect, a system includes a DC bus circuit, a first depletion mode FET, a second depletion mode FET, a voltage sense circuit, a first switching control circuit, and a second switching control circuit. The DC bus circuit has a first bus terminal, a second bus terminal, an intermediate node, a first bus capacitor, and a second bus capacitor. The first bus capacitor has a first terminal coupled to the first bus terminal and a second terminal coupled to the intermediate node. The second bus capacitor has a first terminal coupled to the intermediate node and a second terminal coupled to the second bus terminal. The first depletion mode field effect transistor (FET) has a drain coupled to the first bus terminal, a source, and a gate coupled to the intermediate node. The second depletion mode FET has a drain coupled to the intermediate node, a source, and a gate coupled to the second bus terminal. The voltage sense circuit is configured to sense a first capacitor voltage of the first bus capacitor and a second capacitor voltage of the second bus capacitor. The first switching control circuit is configured to turn the first depletion mode FET off responsive to the first capacitor voltage being less than or equal to the second capacitor voltage. The second switching control circuit is configured to turn the second depletion mode FET off responsive to the first capacitor voltage being greater than or equal to the second capacitor voltage.

In a further aspect, a motor drive includes a rectifier, a DC bus circuit, an inverter, first and second depletion mode FETs, and a control circuit. The DC bus circuit has a first bus terminal coupled to the output of the rectifier, a second bus terminal coupled to the output of the rectifier, a first bus capacitor, and a second bus capacitor. The first and second bus capacitors are coupled in series with one another between the first and second bus terminals, and the first and second bus capacitors and are coupled to one another at an intermediate node. The inverter has an input coupled to the first and second bus terminals, and an output configured to drive a motor load. The first depletion mode FET is coupled between the first bus capacitor and a first switching control circuit. The second depletion mode FET is coupled between the second bus capacitor and a second switching control circuit. The control circuit is configured to control the first and second depletion mode FETs to balance voltages of the first and second bus capacitors.

DETAILED DESCRIPTION

Referring now to the figures, several embodiments or implementations are hereinafter described in conjunction with the drawings, wherein like reference numerals are used to refer to like elements throughout, and wherein the various features are not necessarily drawn to scale.

Figure 1:
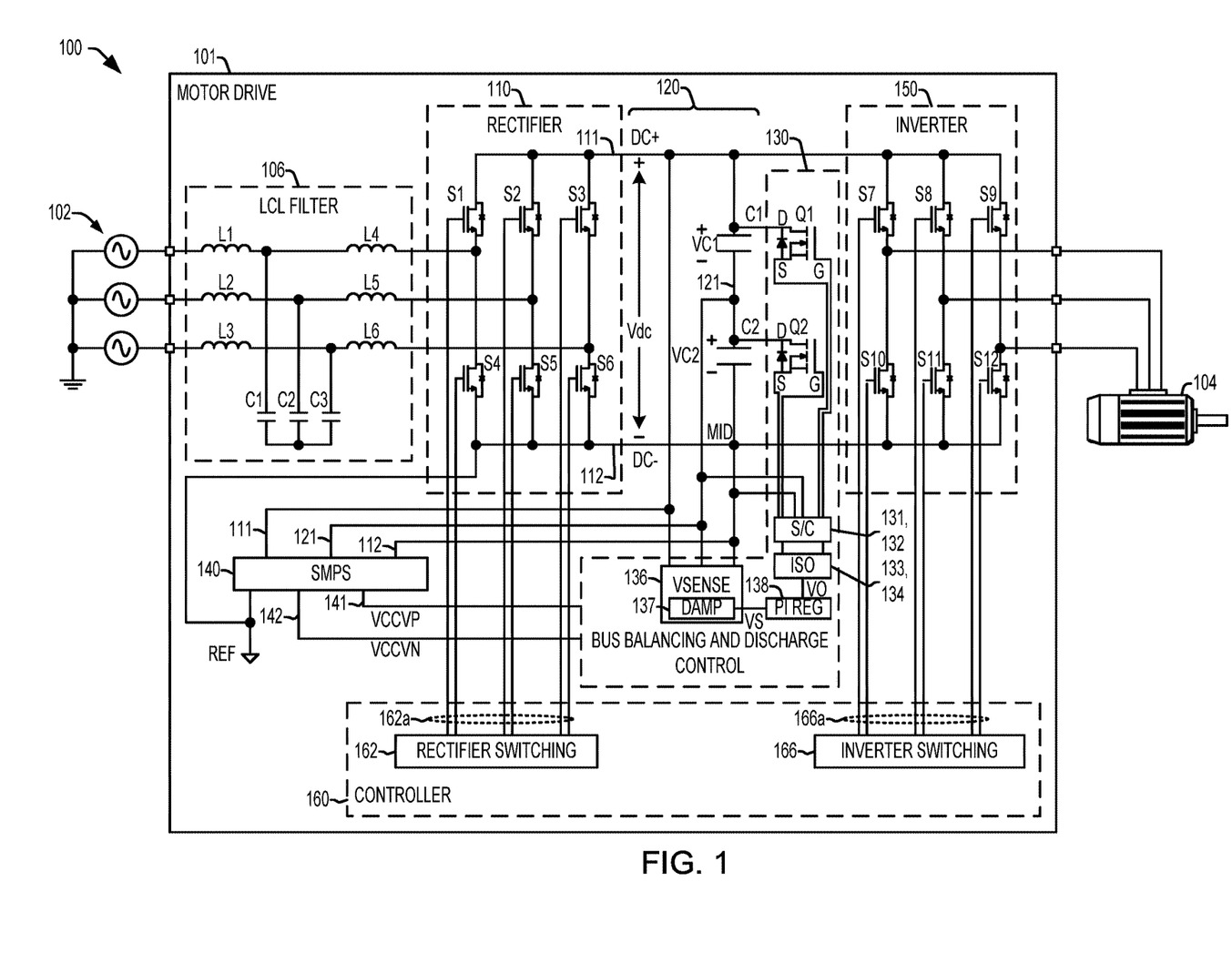
FIG. 1 is a schematic diagram of a power conversion system with a motor drive.
Figure 1A:
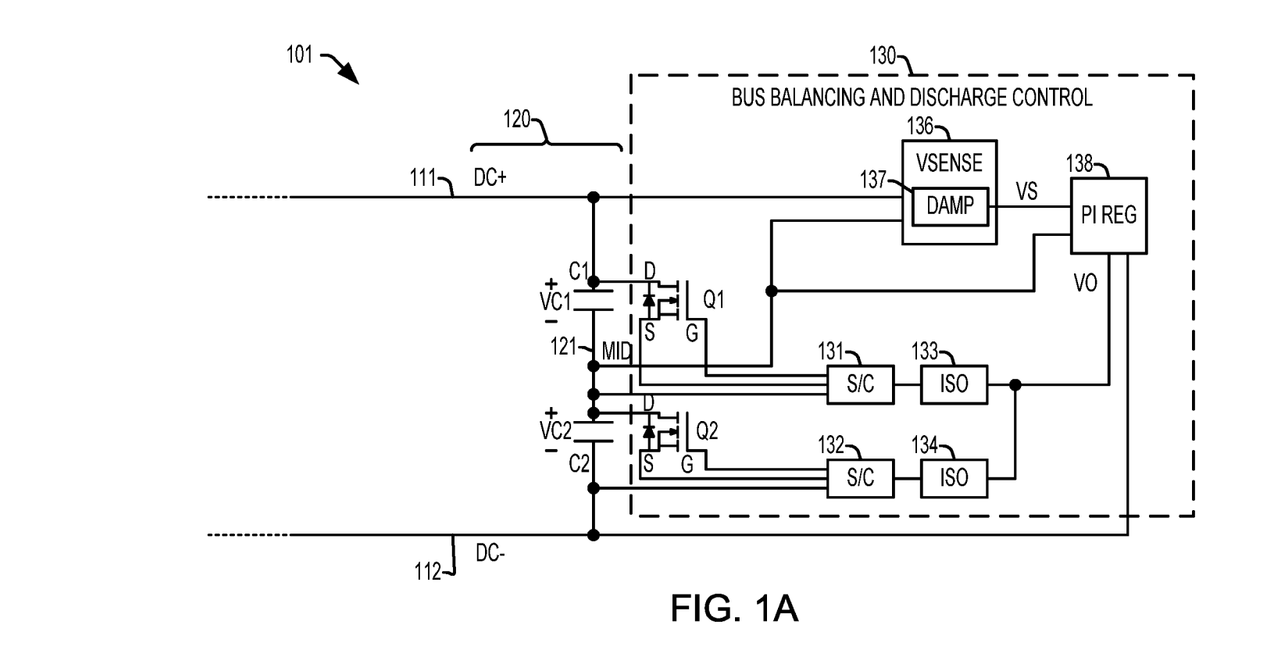
FIG. 1A is a schematic diagram of a bus balancing and discharge control circuit in the system of FIG. 1.
Figure 1B:
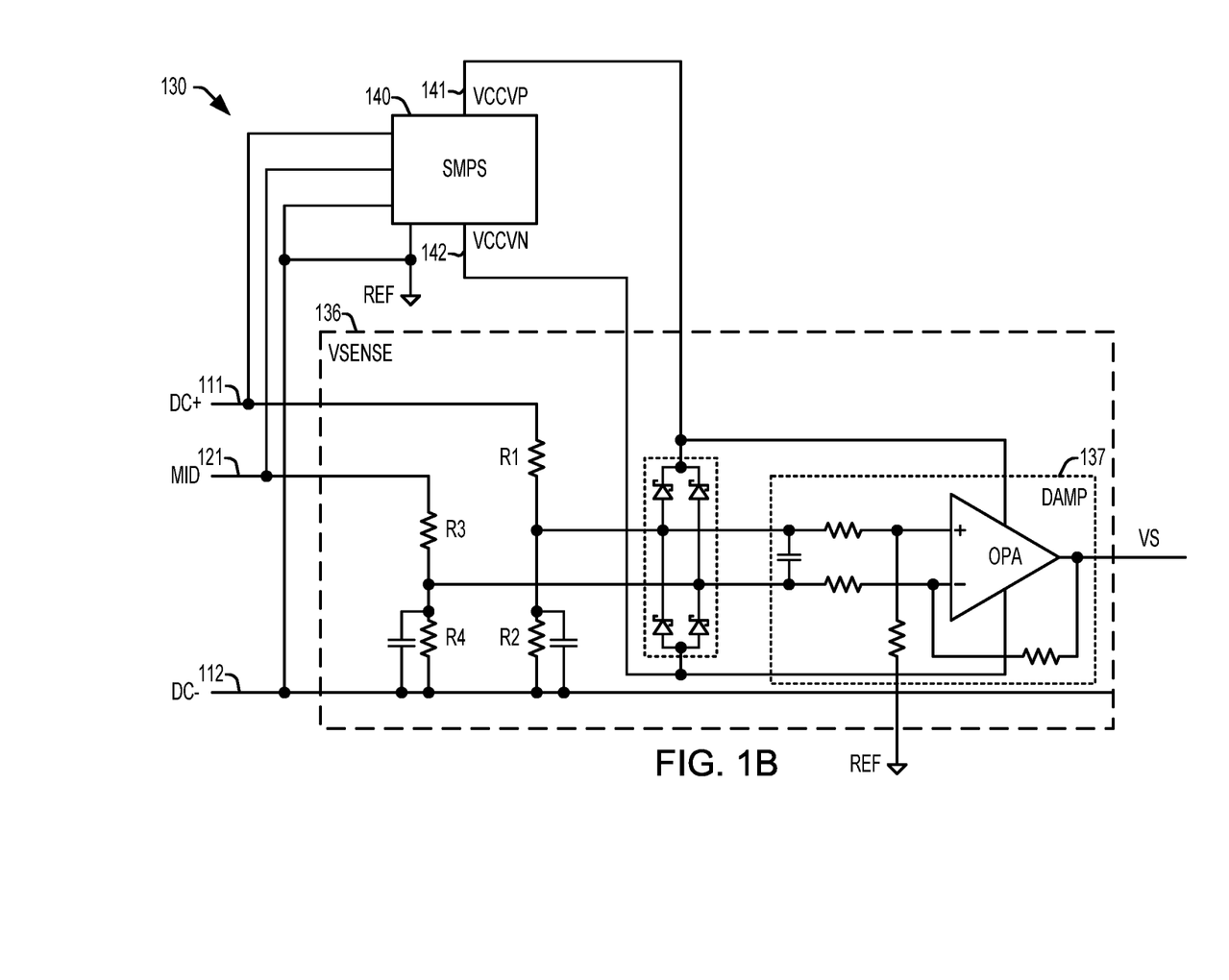
FIG. 1B is a schematic diagram of a voltage sense circuit in the system of FIG. 1.
Figure 1C:
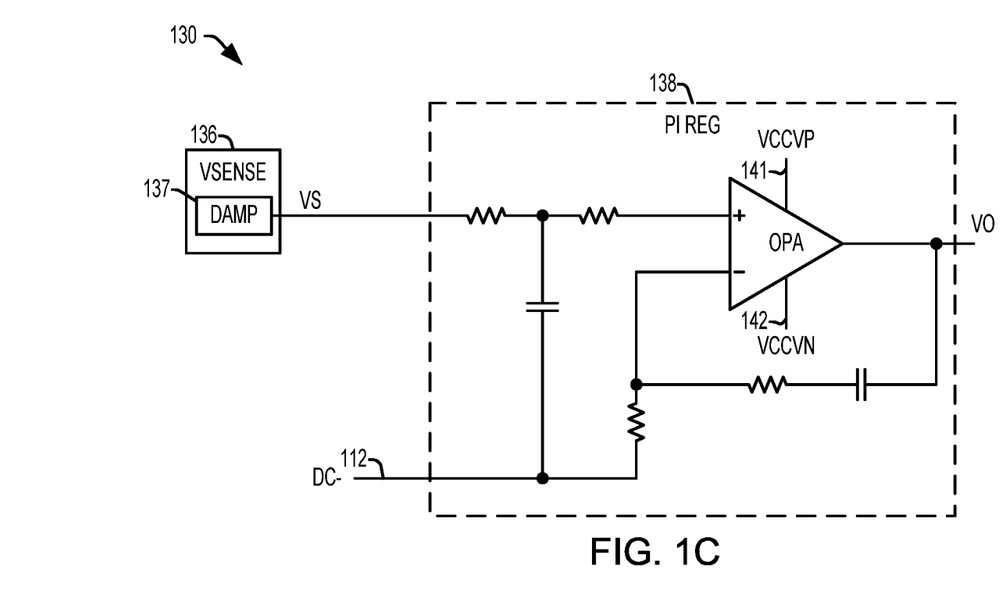
FIG. 1C is a schematic diagram of a regulator circuit in the system of FIG. 1.
Figure 1D:
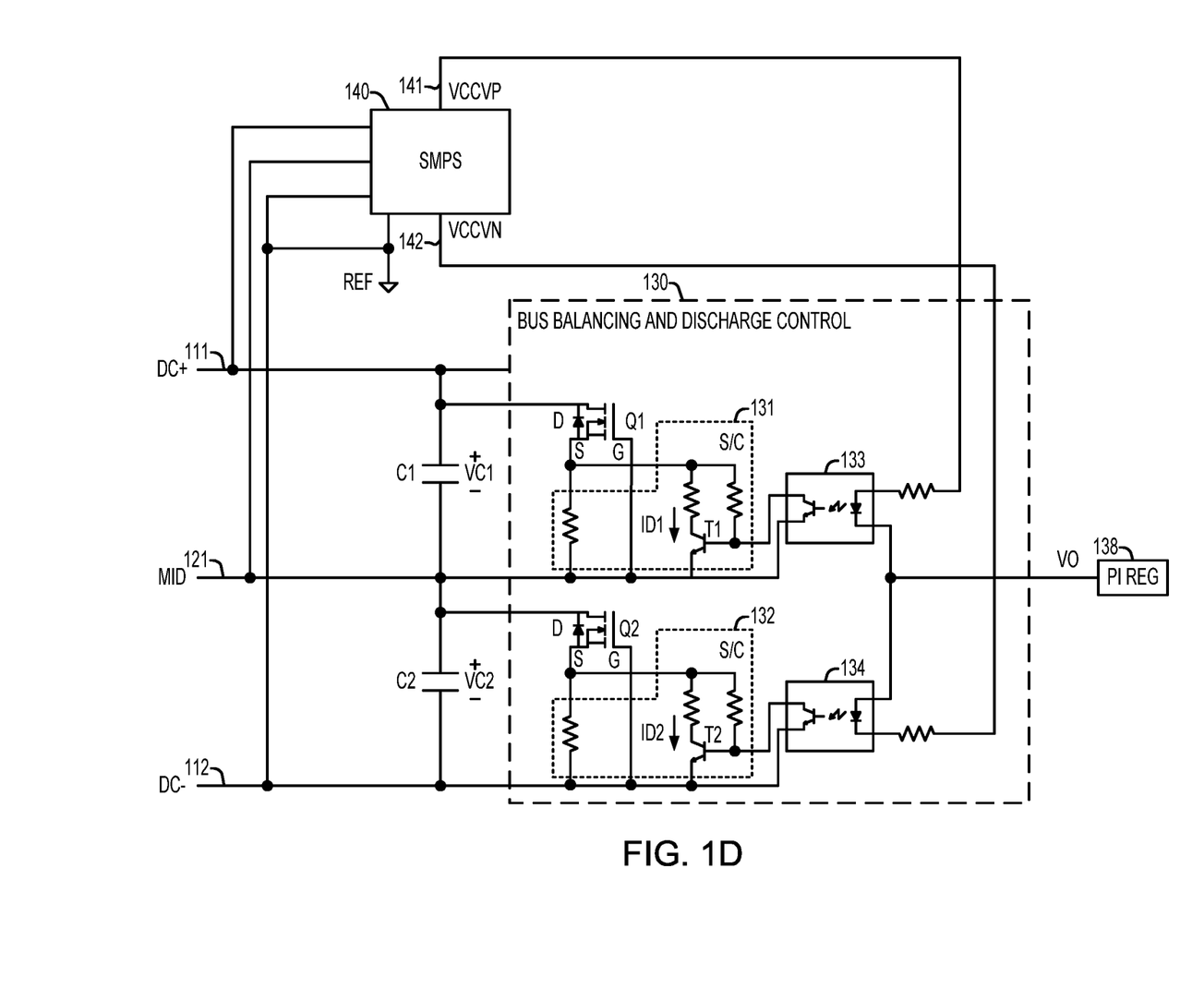
FIG. 1D is a schematic diagram of switching control circuits in the system of FIG. 1.

Referring initially to FIGS. 1-1D, FIG. 1 illustrates a power conversion system 100 with a motor drive power conversion system 101 that receives single or multiphase AC input power from an external power source 102 and provides a single or multi-phase output signal to drive a motor load 104. The illustrated example receives a three-phase input, but other multiphase embodiments are possible. The motor drive 101 includes an input filter circuit 106, in one example, a three phase LCL filter having grid side inductors L1, L2 and L3 connected to the power leads of the power source 102 as well as series connected converter side inductors L4, L5 and L6. The filter circuit 106 has filter capacitors C connected between the corresponding grid and converter side inductors and a common connection node, which may but need not be connected to a system ground. Although illustrated in the context of a three phase LCL filter circuit 106, other alternate circuit configurations can be used, including without limitation LC filters. Moreover, although illustrated as including an input filter circuit 106, the filter circuit 106 may be omitted or modified in other embodiments.

The motor drive 101 includes a rectifier 110, a DC bus or DC link circuit 120, a bus balancing and discharge control circuit 130, a power supply 140 such as a switch mode power supply (SMPS), an output inverter 150, and a controller 160 that operates the rectifier 110 and the inverter 150. The rectifier 110 has an output configured to provide a DC bus voltage signal Vdc. In one example, the rectifier 110 is an active front end (AFE) rectifier as shown in FIG. 1. In another example, a passive diode-based rectifier is used. In another example, the rectifier is a non-regenerative but controlled (e.g., SCR-based) rectifier. The DC bus circuit 120 has a first bus terminal 111 coupled to the output of the rectifier 110 having a voltage labeled DC+, a second bus terminal 112 coupled to the output of the rectifier 110 having a voltage labeled DC−, a first bus capacitor C1, and a second bus capacitor C2. The first and second bus capacitors C1 and C2 are coupled in series with one another between the first and second bus terminals 111 and 112, and the bus capacitors C1 and C2 are coupled to one another at an intermediate node 121 having a voltage labeled MID. The first bus capacitor C1 has a first terminal coupled to the first bus terminal 111 and a second terminal coupled to the intermediate node 121. The second bus capacitor C2 has a first terminal coupled to the intermediate node 121 and a second terminal coupled to the second bus terminal 112. The inverter 150 has an input coupled to the respective first and second bus terminals 111 and 112, and an output configured to drive the motor load 104. The first capacitor C1 can be a single capacitor component, or a combination of multiple capacitor components coupled in any series and/or parallel configuration between the first bus terminal 111 and the intermediate node 121. Similarly, the second capacitor C2 can be a single capacitor component, or a combination of multiple capacitor components coupled in any series and/or parallel configuration between the intermediate node 121 and the second bus terminal 112. In addition, while illustrated in the context of the example having first and second equivalent capacitors C1 and C2, the concepts of the present disclosure include other implementations with more than two equivalent capacitors in series between the bus terminals 111 and 112, for example, to facilitate higher voltage for medium voltage power electronics products and systems, with capacitor voltage balancing and discharging of any integer number of two or more series connected capacitors.

The bus balancing and discharge control circuit 130 operates, when the system 101 is powered and operating, to balance a first capacitor voltage VC1 of the first bus capacitor C1 and a second capacitor voltage VC2 of the second bus capacitor C2. In addition, when the system 101 is not powered or when the power supply 140 is off or has one or more output voltages (e.g., VCCVP or VCCVN) less than a respective threshold, the bus balancing and discharge control circuit 130 discharges the respective first and second bus capacitors C1 and C2 at a high discharge rate. In one example, the bus balancing and discharge control circuit 130 is designed such that high discharge rate does not depend on supply presence, but on some other parameter value, such as DC bus voltage level. When powered and operating, the power supply 140 provides the output voltage signals VCCVP and VCCVN and respective first and second outputs 141 and 142 to operate the control circuitry of the system 101. The power supply 140 has a reference node coupled to a reference with a voltage labeled REF.

The controller 160 includes a rectifier controller 162 and an inverter controller 166 respectively providing rectifier and inverter switching control signal 162a and 166a to the rectifier 110 and the inverter 150 to operate the respective switches S1-S6 and S7-S12 thereof. In certain implementations, the inverter switching controller 166 provides the control signal 166a in order to selectively operate the individual inverter switching devices S7-S12 to provide a variable frequency, variable amplitude output to drive the motor load 104, and the inverter switching controller 166 also provides a setpoint or desired DC signal or value to the rectifier switching controller 162. The rectifier switching controller 162, in turn, generates rectifier switching control signals 162a to operate the rectifier switching devices S1-S6 in order to provide a regulated DC voltage Vdc across the series connected DC link capacitors C1 and C2 in the intermediate DC bus circuit 120 according to the desired or setpoint DC signal or value.

The controller 160 and the components thereof may be implemented as any suitable hardware, processor-executed software, processor-executed firmware, logic, and/or combinations thereof wherein the illustrated controller 160 can be implemented largely in processor-executed software or firmware providing various control functions by which the controller 160 receives feedback and/or input signals and/or values (e.g., setpoint(s)) and provides rectifier and inverter switching control signals 162a and 166a to operate the rectifier switching devices S1-S6 and switches S7-S12 of the inverter 150 to convert input power for providing AC output power to drive the load 104. In addition, the controller 160 and the components thereof can be implemented in a single processor-based device, such as a microprocessor, microcontroller, FPGA, etc., or one or more of these can be separately implemented in unitary or distributed fashion by two or more processor devices.

Moreover, the switching controllers 162 and 166 may provide any suitable form of switch control, including one or more forms of pulse width modulation (PWM) control in providing the switching control signals 162a and/or 166a and various embodiments. Furthermore, the switching control components 162 and 166 may include suitable driver circuitry for providing gate control signals to operate transistor-based switching devices S1-S12.

The bus balancing and discharge control circuit 130 includes a first depletion mode field effect transistor FET Q1 coupled between the first bus capacitor C1 and a first switching control circuit 131, as well as a second depletion mode FET Q2 coupled between the second bus capacitor C2 and a second switching control circuit 132. The first depletion mode FET Q1 has a drain coupled to the first bus terminal 111, a source, and a gate coupled to the intermediate node 121. The second depletion mode FET Q2 has a drain coupled to the intermediate node 121, a source, and a gate coupled to the second bus terminal 112.

The bus balancing and discharge control circuit 130 includes respective first and second switching control circuits 131 and 132 (shown combined in FIG. 1, further illustrated in FIGS. 1A and 1D below), respective first and second isolation circuits 133 and 134 (shown combined in FIG. 1, further illustrated in FIGS. 1A and 1D below).

The bus balancing and discharge control circuit 130 also includes a control circuit with a voltage sense circuit 136 (labeled VSENSE) having a difference amplifier circuit 137 (labeled DAMP), and a regulator 138. The control circuit 136, 137, 138 is configured to control the first and second depletion mode FETs Q1, Q2 to balance the first capacitor voltage VC1 and the second capacitor voltage VC2 during operation of the system 101, and to quickly discharge the bus capacitors C1 and C2 when the system 101 is not powered or when the power supply 140 is off or when VCCVP or VCCVN is less than a respective threshold.

Referring also to FIGS. 1A and 1B, the voltage sense circuit 136 senses the first capacitor voltage VC1 of the first bus capacitor C1 and the second capacitor voltage VC2 of the second bus capacitor C2. FIG. 1B shows one example implementation of the voltage sense circuit 136. The voltage sense circuit 136 in this example includes a first resistive voltage divider circuit formed by resistors R1 and R2 to provide a divided voltage representing the voltage DC+ of the first bus terminal 111. A second resistive voltage divider circuit formed by resistors R3 and R4 provides a second divided voltage representing the voltage MID of the second bus terminal 112. The divided voltages in this example are stabilized by capacitors connected in parallel with the resistors R2 and R4. In this example, moreover, a clamp circuit including senior diodes clamps the voltage divider outputs with respect to the positive supply voltage VCCVP from the output 141 of the power supply 140 and with respect to the negative supply voltage VCCVN from the output 142 of the power supply 140. A stabilizing capacitor in this example is connected across the voltage divider outputs at the input of a difference amplifier 137. The difference amplifier 137 in this example includes an op amp with a non-inverting input coupled by a resistor to the first voltage divider output, and in inverting input coupled by another resistor to the second voltage divider output. A resistor is coupled between the non-inverting input and the reference REF, and a feedback resistor is coupled between the inverting input and the output of the op amp. The output of the op amp provides a sensor voltage signal VS based on the first and second capacitor voltages VC1 and VC2. In the illustrated example, the difference amplifier circuit 137 provides the sensor voltage signal VS based on the difference between the first and second capacitor voltages VC1 and VC2.

FIG. 1C shows further details of an example implementation of the regulator 138. The regulator 138 in this example is a proportional-integral regulator or PI controller that receives the sensor voltage signal VS from the voltage sense circuit 136. The regulator 138 in this example includes an op amp with a non-inverting input coupled through an R-C low pass filter and a second resistor to the output of the voltage sense circuit 136. A capacitor of the low-pass filter is coupled to the second bus terminal 112. The inverting input of the op amp is coupled through a resistor to the second bus terminal 112. A feedback circuit includes a resistor and a capacitor coupled in series between the inverting input of the op amp and the output of the op amp. The op amp output of the regulator 138 provides a control output voltage signal VO.

Referring also to FIG. 1D, the regulator 138 in one example controls the respective first and second depletion mode FETs Q1 and Q2 based on the sensor voltage signal VS. In the illustrated implementation, the control output voltage signal VO is provided through the first and second isolation circuits 133 and 134 to the respective first and second switching control circuits 131 and 132 to operate the first and second depletion mode FETs Q1 and Q2 during normal operation when the power supply 140 is powered and providing the supply voltage signals VCCVP and VCCVN at the appropriate amplitudes.

In normal powered operation, the regulator 138 provides the control output voltage signal VO based on the sensor voltage signal VS. The control output voltage signal VO in one example has a zero amplitude responsive to the first and second capacitor voltages VC1 and VC2 being equal, a positive amplitude responsive to the first capacitor voltage VC1 being greater than the second capacitor voltage VC2, and a negative amplitude responsive to the first capacitor voltage VC1 being less than the second capacitor voltage VC2. The isolation in switching control circuitry of the control circuit controls the first and second depletion mode FETs Q1 and Q2 based on the control output voltage signal VO to implement capacitor voltage balancing during normal operation.

The first isolation circuit 133 in FIG. 1D includes a first optical isolator chip or optocoupler (labeled U1) having an input diode with a cathode coupled to the output of the regulator 138 to receive the control output voltage signal VO, and an anode coupled through a resistor to the power supply output 141 to receive the positive supply voltage VCCVP. The first optical isolator chip 133 includes an output bipolar transistor with a base operated according to current flowing through the diode, a collector coupled to the source of the first depletion mode FET Q1, and an emitter.

The first switching control circuit 131 is coupled to the first depletion mode FET Q1, and turns the first depletion mode FET Q1 off responsive to the first capacitor voltage VC1 being less than or equal to the second capacitor voltage VC2 based on the control output voltage signal VO. In this example, the first switching control circuit 131 operates to turn the first depletion mode FET Q1 off responsive to the control output voltage signal VO having a zero or negative amplitude. The first switching control circuit 131 includes first and second input terminals coupled to the respective collector and emitter outputs of the first isolation circuit 133, with a resistor coupled between the first input terminal and the source of the first depletion mode FET Q1. The first switching control circuit 131 includes a first discharge circuit branch including a first NPN bipolar transistor T1 and a first discharge resistor coupled between the source of the first depletion mode FET Q1 and the intermediate node 121. In addition, the first switching control circuit 131 includes a resistor coupled between the source of the first depletion mode FET Q1 and the intermediate node 121.

During normal powered operation of the system 101, in response to the control output voltage signal VO having a positive amplitude, the first switching control circuit 131 controls the gate-source voltage to exceed the negative threshold voltage of the first depletion mode FET Q1, and the positive amplitude of the control output voltage signal VO turns on the first NPN bipolar transistor T1 to provide a discharge path for conducting a first discharge current ID1 from the source of the first depletion mode FET Q1 in order to provide a controlled discharging of the first bus capacitor C1. The conduction of the first discharge current ID1 reduces the first capacitor voltage VC1 relative to the second capacitor voltage VC2 and tends to equalize the first and second capacitor voltages VC1 and VC2. In addition, when the power supply 140 is turned off or when one or both of the supply voltage is VCCVP or VCCVN are below a respective threshold, the depletion mode transistor Q1 remains on to quickly discharge any voltage of the first bus capacitor C1.

The second isolation circuit 134 and the second switching control circuit 132 are similarly configured in the example of FIG. 1D. The second isolation circuit 134 in FIG. 1D includes a second optical isolator chip or optocoupler (labeled U2) having an input diode with an anode coupled to the output of the regulator 138 to receive the control output voltage signal VO, and a cathode coupled through a resistor to the second power supply output 142 to receive the negative supply voltage VCCVN. The second optical isolator chip 134 includes an output bipolar transistor with a base operated according to current flowing through the diode, a collector coupled to the source of the second depletion mode FET Q2, and an emitter.

The second switching control circuit 132 is coupled to the second depletion mode FET Q2 and turns the second depletion mode FET Q2 off responsive to the first capacitor voltage VC1 being greater than or equal to the second capacitor voltage VC2. In this example, the second switching control circuit 132 operates to turn the second depletion mode FET Q2 off responsive to the control output voltage signal VO having a zero or positive amplitude. The second switching control circuit 132 includes first and second input terminals coupled to the respective collector and emitter outputs of the second isolation circuit 134, with a resistor coupled between the first terminal and the source of the second depletion mode FET Q2. The second switching control circuit 132 includes a second discharge circuit branch including a second NPN bipolar transistor T2 and a second discharge resistor coupled between the source of the second depletion mode FET Q2 and the intermediate node 121. In addition, the second switching control circuit 132 includes a resistor coupled between the source of the second depletion mode FET Q2 and the second bus terminal 112.

During normal powered operation of the system 101, in response to the control output voltage signal VO having a negative amplitude, the second switching control circuit 132 controls the gate-source voltage to exceed the negative threshold voltage of the second depletion mode FET Q2, and the negative amplitude of the control output voltage signal VO turns on the second NPN bipolar transistor T2 to provide a second discharge path for conducting a second discharge current ID2 from the source of the second depletion mode FET Q2 to the second bus terminal 112. This provides a controlled discharging of the second bus capacitor C2. The conduction of the second discharge current ID2 reduces the second capacitor voltage VC2 relative to the first capacitor voltage VC1 and tends to equalize the second and second capacitor voltages VC1 and VC2. In addition, when the power supply 140 is turned off or when one or both of the supply voltages VCCVP or VCCVN are below a respective threshold, the depletion mode transistor Q2 remains on to quickly discharge any voltage of the second bus capacitor C2.

Figure 2:
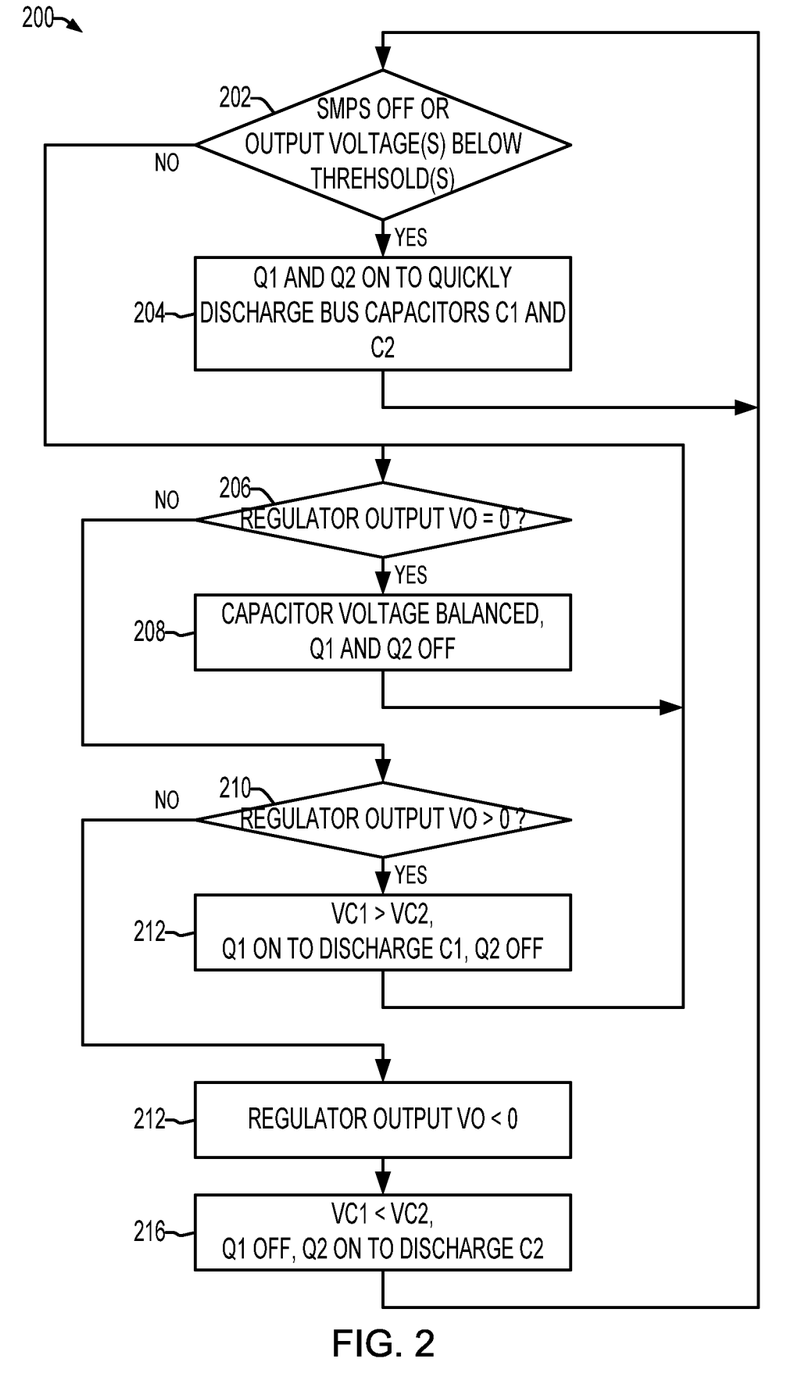
FIG. 2 is a flow diagram illustrating operation of the system of FIG. 1.

Referring also to FIG. 2, the bus balancing and discharge control circuit 130 in one example implements a method 200 for discharging the DC bus capacitor C1 and C2 quickly when the system 101 is powered down, and additionally provides energy efficient and cost-effective DC bus voltage balancing during operation of the system 101. Moreover, the use of the depletion mode FETs for discharging and voltage balancing facilitates very quick discharging, for example, to allow service personnel to perform maintenance on the system 101 without having to wait for extended periods of time. In the illustrated examples, the depletion mode FETs are controlled as active current sinks to balance DC bus voltage at high DC bus levels, and to fast discharge the DC bus circuit 120 when no (or low) control voltage is present.

The method 200 includes a determination at 202 as to whether the power supply 140 (SMPS) is off or has output voltages (e.g., supply voltages VCCVP or VCCVN) below a respective threshold. If so (YES at 202), the first and second depletion mode transistors Q1 and Q2 of the bus balancing and discharge control circuit 130 remain on at 204 in order to quickly discharge the bus capacitor C1 and C2. Otherwise, if the power supply 140 is on and providing adequate supply voltages (NO at 202), the method 200 includes selective operation of the depletion mode transistors Q1 and Q2 according to the control output voltage signal VO from the regulator 138.

The example method 200 includes determining at 206 whether the control output voltage signal VO is zero, and if so (YES at 206), the first and second capacitor voltages VC1 and VC2 are balanced, and the bus balancing and discharge control circuit 130 turns Q1 and Q2 off at 208. If the control output voltage signal VO is not zero (NO at 206), the bus balancing and discharge control circuit 130 determines at 210 whether the control output voltage signal VO is greater than zero (e.g., positive, indicating VC1 is greater than VC2). If so (YES at 210), the bus balancing and discharge control circuit 130 keeps the second depletion mode transistor Q2 off and turns the first depletion mode transistor Q1 on in order to discharge the first bus capacitor C1. The first switching control circuit 131 in one example controls the gate-source voltage of Q1 to control the amplitude of the first discharge current (ID1 in FIG. 1D) based on the positive amplitude of the control output voltage signal VO.

Otherwise, the control output voltage signal VO is less than zero (e.g., negative, indicating VC1 is less than VC2) as indicated at 214 in FIG. 2, and the bus balancing and discharge control circuit 130 keeps the first depletion mode transistor Q1 off and turns the second depletion mode transistor Q2 on in order to discharge the second bus capacitor C2. The second switching control circuit 132 in this example controls the gate-source voltage of Q2 to control the amplitude of the second discharge current (ID2 in FIG. 1D) based on the negative amplitude of the control output voltage signal VO.

The method 200 returns to 202 as described above and operates in continuous fashion to balance the capacitor voltage VC1 and VC2 during normal powered system operation, and quickly discharge the bus capacitors in response to the power supply 140 being turned off or having one or more supply output voltages VCCVP or VCCVN) below the respective thresholds. Bus capacitor voltage balancing is useful in motor drives or other power conversion systems having high voltage DC bus circuits, for example, using electrolytic capacitors having insulation resistance that can vary based on applied voltage, temperature, age, design and manufacturing tolerances, leading to leakage current. Absent capacitor voltage balancing, the equivalent insulation resistance ratio between each line of bus capacitors C1 and C2 connected in series across the DC bus terminals 111 and 112 controls the capacitor voltages VC1 and VC2.

With respect to the first bus capacitor C1, if VO>0, the input current of the first isolation circuit 133 will reduce, then, its output will be turned off, the transistor T1 will be turned on, the first discharge current ID1 will increase, and the first depletion mode FET Q1 will be turned on to discharge the capacitor C1. If VO=0, the input current of the first isolation circuit 133 will be big enough to turn on the output of the first isolation circuit 133, the transistor T1 will be turned off, and Q1 will be turned off. If VO<0, the input current of the first isolation circuit 133 will increase, then its output will be turned on, the transistor T1 will be turned off, and Q1 will be turned off. For the second bus capacitor C2, if VO<0, the input current the second isolation circuit 134 will reduce, then its output will be turned off, the transistor T2 will be turned on, the second discharge current ID2 will increase, and the second depletion mode FET Q2 will be turned on to discharge the capacitor C2. If VO=0, the input current of the second isolation circuit 134 will be large enough to turn on the output of the second isolation circuit 134, the transistor T2 will be turned off, and Q2 will be turned off. If VO>0, the input current of the second isolation circuit 134 will increase, then its output will be turned on, the transistor T2 will be turned off, and Q2 will be turned off.

The described examples and other implementations facilitate even voltage sharing between each line of capacitors connected in series across the DC bus 120 by closed loop operation of the regulator 138, and also provide fast discharging of electrical charge stored in the DC bus capacitors at lower voltage levels when control power supply is not available. The described depletion mode FET balancing and discharge circuits provide advantages over simple external balancing circuits using balance resistors in parallel with each line, which need to have small enough resistance values to provide voltage balance under worst case conditions and are thus not energy efficient and dissipate high amounts of unnecessary heat, and which must be large and expensive. Moreover, parallel discharge capacitors require a long period of time to discharge bus capacitors to safe DC voltage levels.

Figure 3:
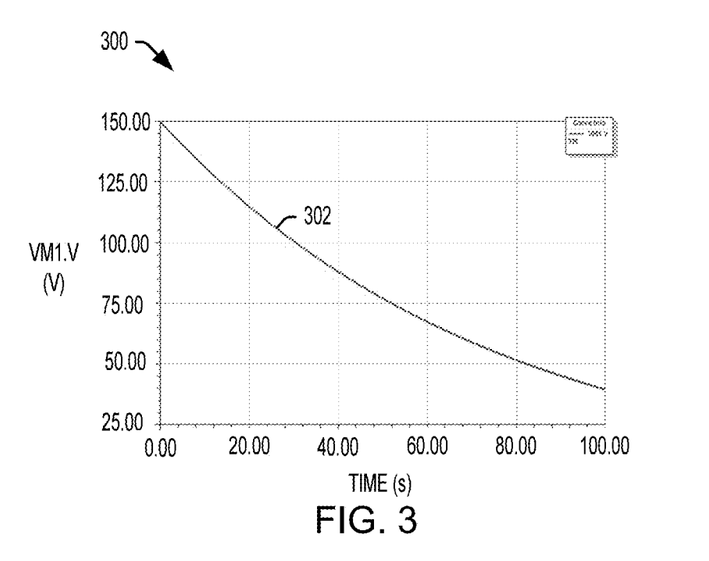
FIGS. 3 and 4 are comparative DC bus voltage discharge graphs.
Figure 4:
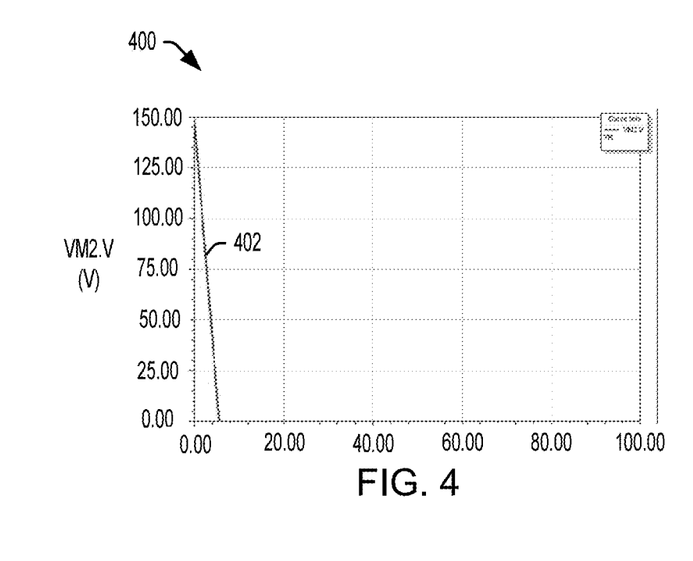

FIGS. 3 and 4 illustrate comparative DC bus voltage discharge performance. A graph 300 in FIG. 3 shows a DC bus voltage curve 301 illustrating performance of a system using parallel discharge resistors starting from an initial DC bus voltage of 150 V. In this example, the high cost, low efficiency resistive discharge circuitry takes a long period of time to discharge the DC bus to safe voltage levels, in which the bus voltage remains above 50 V after 80 seconds and remains above 25 V at 100 seconds following the system being turned off. In this example, maintenance personnel must wait for a long time (e.g., two minutes or more) before servicing the equipment. A graph 400 and FIG. 4 is a DC bus voltage curve 401 that illustrates DC bus voltage discharging operation of an implementation of the bus balancing and discharge control circuit 130 described above using depletion mode FETs Q1 and Q2. In this implementation, the DC bus voltage is quickly discharged, and reaches 0 V in a few seconds, thereby allowing quick access by service personnel after the power supply is turned off.

In the described examples, the depletion mode FETs Q1 and Q2 are controlled such that they only conduct when capacitor voltage balancing is required and with minimal current needed, thereby providing energy efficient operation along with low cost and small form factor advantages. In addition, as shown in FIGS. 3 and 4, the described examples provide significant advantages with respect to fast discharge of the DC bus capacitor C1 and C2, particularly at low DC voltage levels when control power supply voltage is not present by sinking current of the depletion mode FETs to a high or maximum value. Compared with existing solutions, therefore, the described examples demonstrate better energy efficiency, lower heat dissipation, faster DC bus discharge time, lower cost, smaller footprint, and better mechanical/reliability performance.

Various embodiments have been described with reference to the accompanying drawings. Modifications and changes may be made thereto, and additional embodiments may be implemented, without departing from the broader scope of the invention as set forth in the claims that follow. The specification and drawings are accordingly to be regarded in an illustrative rather than restrictive sense. The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A system, comprising:
a DC bus circuit having a first bus terminal, a second bus terminal, a first bus capacitor, and a second bus capacitor, the first and second bus capacitors coupled in series with one another between the first and second bus terminals, and the first and second bus capacitors and are coupled to one another at an intermediate node;
a first depletion mode field effect transistor (FET) coupled between the first bus capacitor and a first switching control circuit;
a second depletion mode FET coupled between the second bus capacitor and a second switching control circuit; and
a control circuit configured to control the first and second depletion mode FETs to balance a first capacitor voltage of the first bus capacitor and a second capacitor voltage of the second bus capacitor;
wherein the first and second depletion mode FETs are configured to discharge the respective first and second bus capacitors responsive to a power supply having an output voltage being less than a threshold;
wherein:
the control circuit includes a voltage sense circuit configured to sense the first capacitor voltage and the second capacitor voltage, and provide a sensor voltage signal based on the first and second capacitor voltages, and a regulator configured to control the first and second depletion mode FETs based on the sensor voltage signal; and
the regulator is configured to provide a control output voltage signal based on the sensor voltage signal, the control output voltage signal having a zero amplitude responsive to the first and second capacitor voltages being equal, a positive amplitude responsive to the first capacitor voltage being greater than the second capacitor voltage, and a negative amplitude responsive to the first capacitor voltage being less than the second capacitor voltage.

2. The system of claim 1, wherein the regulator is a proportional integral (PI) regulator.

3. The system of claim 1, wherein:
the control circuit is configured to control the first and second depletion mode FETs based on the control output voltage signal;
the first switching control circuit is coupled to the first depletion mode FET and configured to turn the first depletion mode FET off responsive to the control output voltage signal having a zero or negative amplitude; and
the second switching control circuit is coupled to the second depletion mode FET and configured to turn the second depletion mode FET off responsive to the control output voltage signal having a zero or positive amplitude.

4. The system of claim 3, wherein:
a drain of the first depletion mode FET is coupled to the first bus terminal;
the first switching control circuit includes a first discharge circuit branch coupled between a source of the first depletion mode FET and the intermediate node;
a drain of the second depletion mode FET is coupled to the intermediate node; and
the second switching control circuit includes a second discharge circuit branch coupled between a source of the second depletion mode FET and the second bus terminal.

5. The system of claim 4, wherein:
the first discharge circuit branch includes a first bipolar transistor coupled between the source of the first depletion mode FET and the intermediate node; and the second discharge circuit branch includes a second bipolar transistor coupled between the source of the second depletion mode FET and the second bus terminal.

6. The system of claim 1, wherein:
the first switching control circuit is configured to turn the first depletion mode FET off responsive to the first capacitor voltage being less than or equal to the second capacitor voltage when the power supply is on and the output voltage is greater than or equal to the threshold; and
the second switching control circuit is configured to turn the second depletion mode FET off responsive to the first capacitor voltage being greater than or equal to the second capacitor voltage when the power supply is on and the output voltage is greater than or equal to the threshold.

7. A system, comprising:
a DC bus circuit having a first bus terminal, a second bus terminal, a first bus capacitor, and a second bus capacitor, the first and second bus capacitors coupled in series with one another between the first and second bus terminals, and the first and second bus capacitors are coupled to one another at an intermediate node;
a first depletion mode field effect transistor (FET) coupled between the first bus capacitor and a first switching control circuit;
a second depletion mode FET coupled between the second bus capacitor and a second switching control circuit; and
a control circuit configured to control the first and second depletion mode FETs to balance a first capacitor voltage of the first bus capacitor and a second capacitor voltage of the second bus capacitor;
wherein:
the first switching control circuit is configured to turn the first depletion mode FET off responsive to the first capacitor voltage being less than or equal to the second capacitor voltage;
the second switching control circuit is configured to turn the second depletion mode FET off responsive to the first capacitor voltage being greater than or equal to the second capacitor voltage;
a drain of the first depletion mode FET is coupled to the first bus terminal;
the first switching control circuit includes a first discharge circuit branch coupled between a source of the first depletion mode FET and the intermediate node;
a drain of the second depletion mode FET is coupled to the intermediate node; and
the second switching control circuit includes a second discharge circuit branch coupled between a source of the second depletion mode FET and the second bus terminal.

8. The system of claim 7, wherein:
the first discharge circuit branch includes a first bipolar transistor coupled between the source of the first depletion mode FET and the intermediate node; and
the second discharge circuit branch includes a second bipolar transistor coupled between the source of the second depletion mode FET and the second bus terminal.

9. The system of claim 7, wherein:
the first depletion mode field effect transistor (FET) having a gate directly connected to the intermediate node; and
the second depletion mode FET having a gate directly connected to the second bus terminal;
the system further comprising a voltage sense circuit configured to sense a first capacitor voltage of the first bus capacitor and a second capacitor voltage of the second bus capacitor.

10. The system of claim 9, wherein:
the first switching control circuit includes a first discharge circuit branch coupled between a source of the first depletion mode FET and the intermediate node; and
the second switching control circuit includes a second discharge circuit branch coupled between a source of the second depletion mode FET and the second bus terminal.

11. The system of claim 10, wherein:
the first discharge circuit branch includes a first bipolar transistor coupled between the source of the first depletion mode FET and the intermediate node; and
the second discharge circuit branch includes a second bipolar transistor coupled between the source of the second depletion mode FET and the second bus terminal.

12. The system of claim 9, wherein the first and second depletion mode FETs are configured to discharge the respective first and second bus capacitors and responsive to a power supply being off or having an output voltage less than a threshold.

13. A system, comprising:
a DC bus circuit having a first bus terminal, a second bus terminal, a first bus capacitor, and a second bus capacitor, the first and second bus capacitors coupled in series with one another between the first and second bus terminals, and the first and second bus capacitors are coupled to one another at an intermediate node;
a first depletion mode field effect transistor (FET) coupled between the first bus capacitor and a first switching control circuit;
a second depletion mode FET coupled between the second bus capacitor and a second switching control circuit; and
a control circuit configured to control the first and second depletion mode FETs to balance a first capacitor voltage of the first bus capacitor and a second capacitor voltage of the second bus capacitor;
wherein the control circuit includes: a voltage sense circuit configured to sense the first capacitor voltage of the first bus capacitor and the second capacitor voltage of the second bus capacitor, and provide a sensor voltage signal based on the first and second capacitor voltages;
and a regulator configured to control the first and second depletion mode FETs based on the sensor voltage signal; and
wherein the regulator is configured to provide a control output voltage signal based on the sensor voltage signal, the control output voltage signal having a zero amplitude responsive to the first and second capacitor voltages being equal, a positive amplitude responsive to the first capacitor voltage being greater than the second capacitor voltage, and a negative amplitude responsive to the first capacitor voltage being less than the second capacitor voltage.

14. The system of claim 13, wherein:
the first switching control circuit is coupled to the first depletion mode FET and configured to turn the first depletion mode FET off responsive to the control output voltage signal having a zero or negative amplitude; and the second switching control circuit is coupled to the second depletion mode FET and configured to turn the second depletion mode FET off responsive to the control output voltage signal having a zero or positive amplitude.

15. A system, comprising:
a DC bus circuit having a first bus terminal, a second bus terminal, a first bus capacitor, and a second bus capacitor, the first and second bus capacitors coupled in series with one another between the first and second bus terminals, and the first and second bus capacitors and are coupled to one another at an intermediate node;
a first depletion mode field effect transistor (FET) coupled between the first bus capacitor and a first switching control circuit;
a second depletion mode FET coupled between the second bus capacitor and a second switching control circuit; and
a control circuit configured to control the first and second depletion mode FETs to balance a first capacitor voltage of the first bus capacitor and a second capacitor voltage of the second bus capacitor;
wherein the first and second depletion mode FETs are configured to discharge the respective first and second bus capacitors responsive to a power supply having an output voltage being less than a threshold;
wherein the system includes a motor drive, comprising:
a rectifier having an output;
the DC bus circuit;
an inverter;
the first depletion mode field effect transistor (FET); and
the second depletion mode FET;
wherein the control circuit includes a voltage sense circuit configured to sense the first capacitor voltage and the second capacitor voltage, and provide a sensor voltage signal based on the first and second capacitor voltages, and a regulator configured to control the first and second depletion mode FETs based on the sensor voltage signal; and
wherein the regulator is configured to provide a control output voltage signal based on the sensor voltage signal, the control output voltage signal having a zero amplitude responsive to the first and second capacitor voltages being equal, a positive amplitude responsive to the first capacitor voltage being greater than the second capacitor voltage, and a negative amplitude responsive to the first capacitor voltage being less than the second capacitor voltage.

* * * * *